Figure 1:
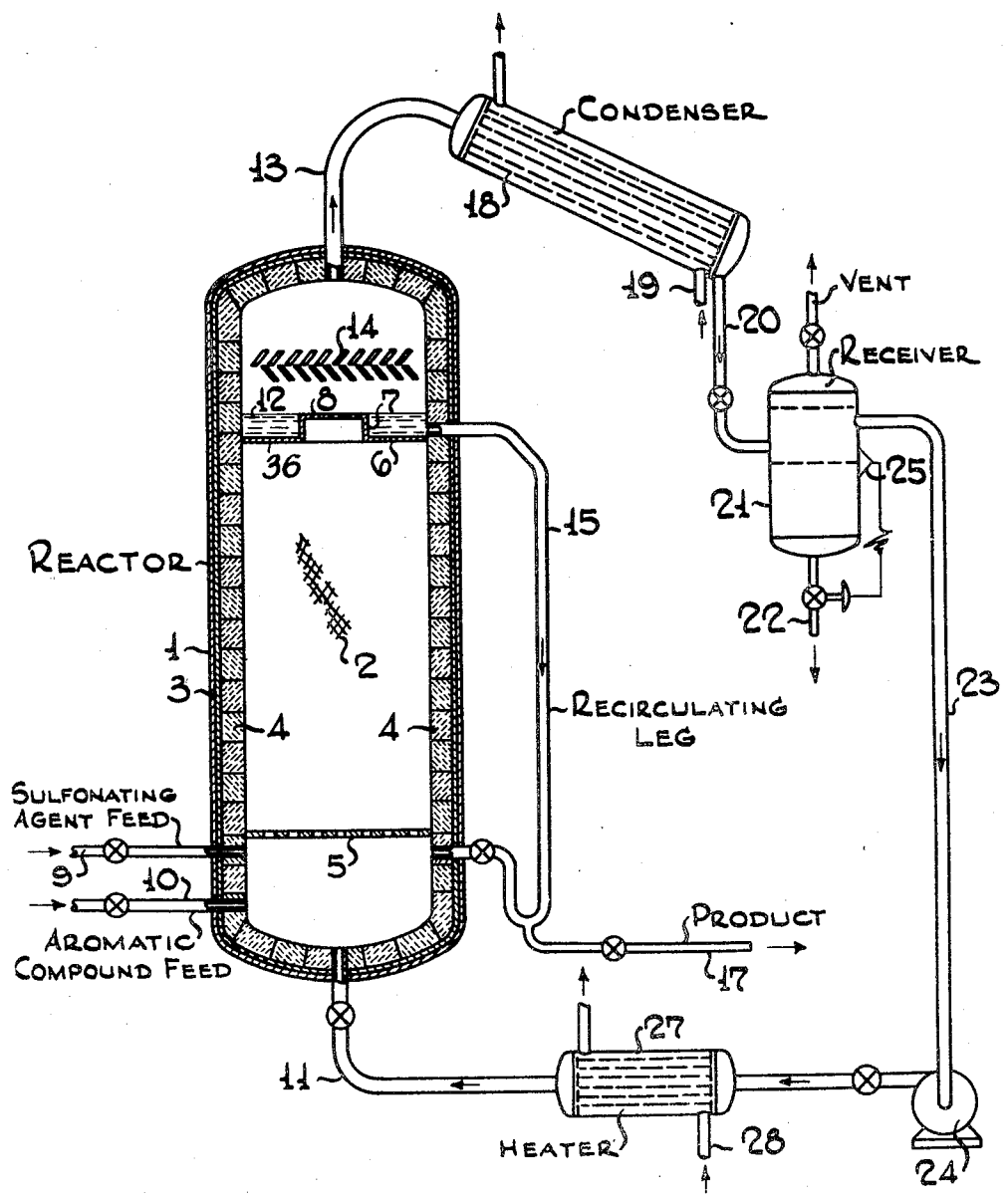

Patented Feb. 6, 1951

2,540,519

UNITED STATES PATENT OFFICE 2,540,519

APPARATUS AND PROCESS FOR CONTINUOUS SULFONATION OF AROMATIC COMPOUNDS

A Donald Green and E. Wendell Carrier, Cranford, N. J., assignors to Standard Oil Development Company, a corporation of Delaware Application February 21, 1946, Serial No. 649,298

5 Claims. (Cl. 260—505)

This invention relates to a method and means by which sulfonation of benzene and its derivatives may be carried out continuously and economically.

Prior to the first World War, the so-called excess acid method was employed in batch sulfonation of benzene. This method consists in gradually adding benzene to excess liquid sulfonating acid heated in a vessel equipped with an agitator.

Subsequent to the first World War and up until the present time, sulfonation of benzene has been most generally carried out in batch operations by the so-called Guyot, or Tyrer, process as described in U. S. Patent 1,210,725. This process consists in passing the hydrocarbon to be sulfonated as a vapor through strong sulfuric acid, gradually heated in a still until about 80% or more of the sulfuric acid batch is reacted. Unreacted benzene and water liberated by the sulfonation are collected as a distillate from the still. Liquid benzene is separated from the water distillate, vaporized, and recycled.

Efforts were made to develop continuous sulfonation processes, such as one in which the acid is flowed countercurrently to an excess of benzene in liquid phase and another in which an excess of preheated acid is flowed countercurrently to ascending benzene vapors. In these, the acid is indicated to become of weaker strength on contact with the fresh benzene feed and to be incompletely reacted.

Up until the present time a continuous process for sulfonation of aromatic compounds has not been considered commercially practical.

An object of this invention is to provide a practical sulfonation process and apparatus in which the reactants may be continuously fed and products be continuously withdrawn at controlled rates correlated to the rate of reaction, with reaction of the sulfonating agent progressing to completion in the direction of flow of the reactants.

Another object is to provide a method and means for obtaining improved control of reaction conditions in a continuous sulfonation of aromatic compounds through efficient mixing and circulation of the reacting mixture for avoidance of localized hot spots and localized high concentrations of sulfonating agent.

Further objects and advantages will become apparent from the following description.

Salient features of the present invention comprise: effective mixing and circulation of the reactants passed confluently through a liquid phase reaction zone with a heated vapor carrier for removing water rapidly as soon as liberated by the reaction; and improved uniformity of reaction through efficient recirculation of liquid sulfonated product.

With uniformity in reaction, the operation is set up for proportioning the reactant feeds continuously to obtain maximum utilization of the sulfonating acid. The acid and aromatic reactant feeds are preferably measured and continuously introduced as liquids into the reaction vessel. The aromatic feed may, however, all be vaporized before entering the reaction zone.

Superheated vapors of excess reacting aromatic compound recovered from the process are conveniently used as the vapor carrier for stripping water liberated in the reaction, but other vaporized or gaseous substances which do not react in the reaction zone, such as natural gas, may be used to obtain the stripping action. The vapor carrier also functions to aid mixing and circulation of fluids through the reaction zone and in regulating the reaction zone temperature.

The continuous reaction vessel or sulfonator, suitably designed to contain the liquid reactants and products, is of an elongated form which allows adequate space of travel for the reaction mixture to obtain the desired amount of reaction therein before the mixture reaches the end of the reaction zone. The preferred form of reaction vessel is a cylindrical vertical tower, which may or may not contain inert packing. For practical reasons, the capacity of the tower or reaction vessel is limited, and accordingly the rates of flow of the reactants and the vapor carrier through the vessel have to be adjusted to provide the necessary reaction time.

To obtain uniformity of reaction, the liquid reaction product is separated from the volatile by-product and from the unreacted aromatic compound on being discharged from the reaction zone; and a suitable portion of the discharged liquid product is returned to the reaction zone for admixture with fresh feed of reactants. Recirculation of a major portion of the liquid sulfonation product helps to bring about complete reaction of the sulfonating agent and is useful in obtaining better selectivity. Thus, the desired end product may be continuously withdrawn containing substantially none of the unreacted aromatic compound, volatile by-product, or unreacted sulfonating agent.

A more detailed description of the process and apparatus will be given with reference to the accompanying drawing.

Fig. 1 in the drawing shows diagrammatically a vertical cross-section view of the reaction vessel and a flow plan of auxiliary equipment as used in a preferred embodiment. The sulfonation of benzene is shown as an example of the process.

Figure 2:
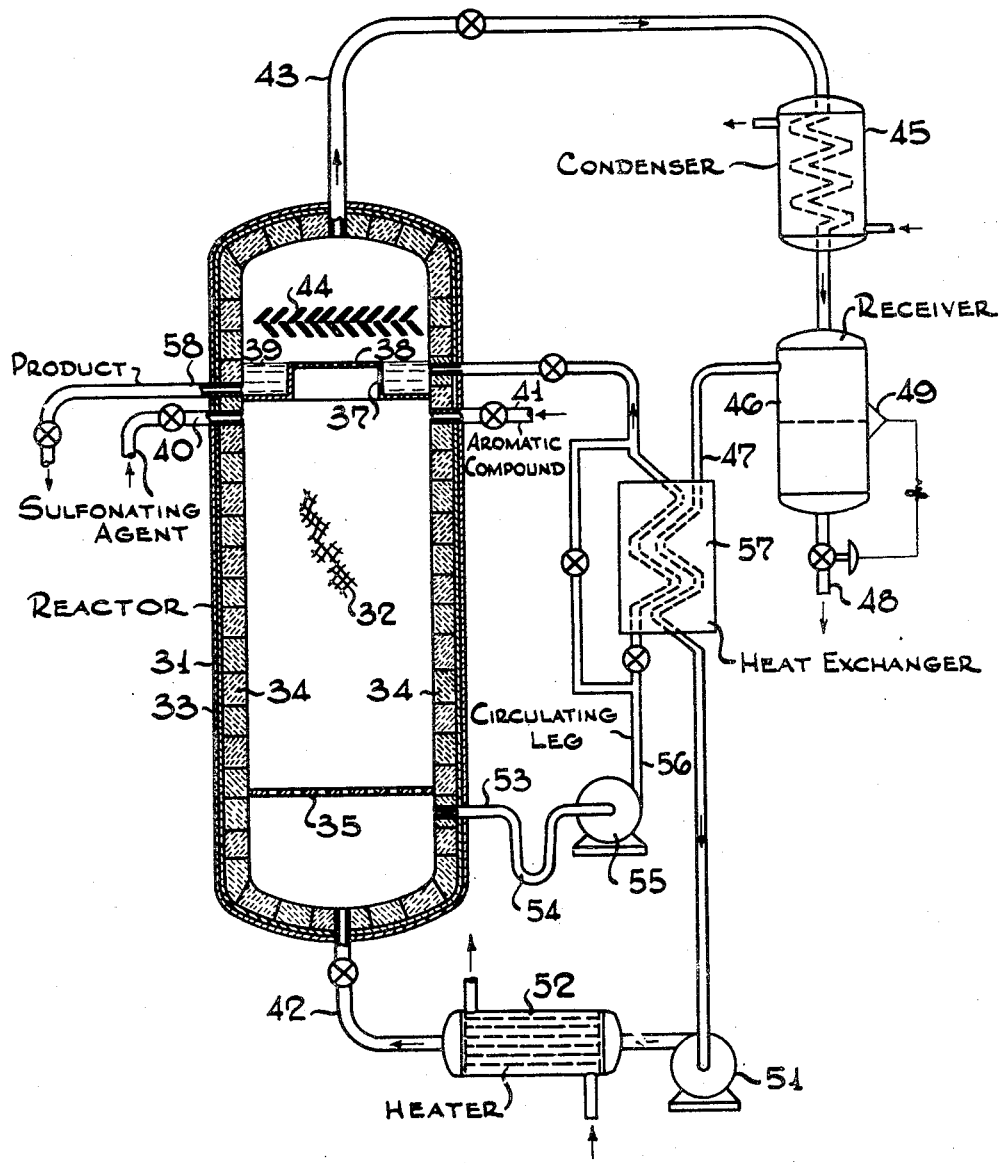

Fig. 2 shows diagrammatically a vertical cross-section view of an alternative form of sulfonator.

Referring to Fig. 1 of the drawing, tower 1 containing an inert packing 2, such as Raschig rings or similar packing for effecting intimate vapor-liquid contact, represents the reaction vessel or sulfonator. Tower 1 may be constructed of cast iron, which resists corrosion by the acid, or may be made of steel with a lead lining 3 and an inner brick lining 4. A brick and lead-lined steel tower is preferred in constructing a tower of considerable height.

The packing 2 is supported on a perforated distributor plate or grid 5 deposed horizontally near the bottom of tower 1. At the upper end of the reaction zone, which is filled by packing 2, is placed a retainer 6, preferably in the form of an annular disk with a central chimney opening 7 for discharge of fluids from the reaction zone. The chimney 7 may be covered with a perforated plate, screen, or grate 8 for preventing escape of loose packing material.

Fresh acid of suitable strength for the sulfonation reaction, e. g., 98% sulfuric acid, is introduced continuously into the bottom of tower 1 from storage by pipe 9. Liquid benzene is introduced continuously from storage by pipe 10 into the bottom of tower 1. Both the acid and the liquid benzene are introduced continuously, preferably in stoichiometric proportions, to enter the reaction zone through the distributor plate 5.

Benzene vapor, preferably superheated, e. g., to a temperature of about 250° F., is blown into tower 1 from pipe 11 near or below the charging point of liquid feed. The liquid reactant feeds and the vapor become thoroughly mixed while passing through the openings in the distributor plate 5 to flow upwardly through the packed reaction zone.

A liquid level 12 is maintained in the retainer 6 over the packing near the top of the reaction vessel but below the top of the chimney 7. Benzene and water vapors disengage from the liquid reaction products discharged through chimney 7 from the reaction zone and are withdrawn at the top of the tower 1 by pipe 13. A set of baffles or additional Raschig ring packing 14 in the upper part of the tower 1 knocks out entrained liquids while permitting the vapors to pass.

At a level below the liquid 12 but above the retainer 6, a pipe 15, acting as a recirculating leg, takes off liquid reaction product from the side of the tower 1 and extends below the bottom level of the reaction zone as a liquid seal and thence to a point for reintroducing liquid reaction product into the tower at the level of the feed pipes, 9 and 10. A drawoff line 17, which may be connected to a pump, not shown, is used for removal of liquid product from the system and to control the liquid level 12 in the tower. Additional recirculating legs may be used in a similar manner, if desired. It may also be desirable to introduce heat exchangers into one or more of the circulating legs to aid in controlling the reaction temperature.

Benzene and water vapors withdrawn overhead from tower 1 by pipe 13 are passed to condenser 18 provided with a cooling coil 19. Benzene and water condensates are led from condenser 18 by pipe 20 to condensate receiver 21.

In receiver 21, the condensates separate into an upper liquid benzene phase and a lower water phase. Water is withdrawn from the receiver through line 22, either to be disposed of as waste or to be processed for recovery of small amounts of benzene. Withdrawal of the water is automatically controlled by equipping the receiver with a dual gravity liquid level controller 25, which is responsive to the interface level of the two liquid phases in the receiver and regulates a discharge valve in line 22.

Benzene in the upper liquid phase is continuously decanted from the receiver and withdrawn through line 23 connected to pump 24. Benzene condensate is discharged by pump 24 into the vaporizer and superheater 27, wherein the benzene is heated through indirect heat exchange by condensing steam in heating coil 28. The benzene is vaporized and superheated to a temperature up to about 250° F. by means of steam in coil 28 at about 120 pounds per square inch. The benzene vapor thus superheated is blown into the bottom of tower 1 from pipe 11.

It has been found unnecessary to use additional heating or cooling equipment for obtaining suitable reaction temperatures in the sulfonator, although auxiliary heat exchangers may be placed in the circulating legs if desired. When the system is brought into operation, introduction of superheated benzene vapor serves to bring the reaction charge up to a temperature where sulfonation will start. When the sulfonation reaction is taking place more than enough heat is liberated to maintain the temperature constant at about 340° F. in the reaction zone. The benzene vapor superheated to only 250° F. is, therefore, employed to control the temperature at the desired point by removing a part of the heat of reaction.

The liquids charged and recirculated liquid product are mixed with benzene vapor by flowing through perforations in the distributing plate. This serves to disperse the vapor evenly, and the packing 2 in the reaction zone helps to maintain the dispersion. As the reacting mixture advances into the reaction zone, the temperature of the stream soon reaches that of the main body of liquid present in the tower, and the reaction progresses smoothly to the end of the reaction zone where completion is attained. With adjustment of the flow rates, very little free sulfuric acid remains in the liquid product discharged from the reaction zone which is almost entirely composed of liquid benzenesulfonic acid.

In the case where concurrent upward flow of liquid feed streams, products, and carrier vapor is maintained, circulation is automatically set up in the recirculating legs by the difference between the density of the vapor-liquid reaction mixture in the reaction zone and of the vapor-free liquid product in the recirculating legs. The use of pumps or agitators, which must be corrosion resistant to sulfuric acid of 80–98% strength, is avoided through this automatic circulation.

If it is desired to introduce the liquid reactants at the top of the reaction zone to flow downwardly and countercurrently to the rising carrier vapor, it is necessary to employ a pump to recirculate the liquid products to the top of the reactor, as illustrated in Fig. 2. In other respects the operation of the sulfonator in the latter case would be the same as in the preferred embodiment, wherein entirely concurrent flow of the reactants and stripping vapor exists in the reaction zone.

In Fig. 2, the reactor is constructed of steel shell 31 with lead lining 33 and inner brick lining 34. Packing 32 inside the reactor is supported by perforated distributing plate 35. Annular disk 36 above the packing 32 has a central chimney 37 covered by perforated disk 38. A liquid aromatic compound to be sulfonated and a liquid sulfonating agent are fed into the reactor near the upper liquid level 39 from pipes 40 and 41, respectively.

Recirculated liquid sulfonation product from upper liquid level 39 overflows through perforated disk 38 to form a downwardly flowing liquid mixture with the fresh feed of reactants from pipes 40 and 41. This downwardly flowing liquid mixture is brought into intimate contact with an ascending stream of heated carrier vapor blown into the reaction zone near its bottom liquid level from pipe 42 to be stripped by the carrier vapor of a volatile by-product, such as water, as it is formed.

The carrier vapor mixed with the vaporized by-product flows through perforations in disk 38 and is withdrawn from the reactor above liquid level 39 by pipe 43 after passing the baffles 44, which knock out entrained liquid. Condensable vapors, such as vapor of excess aromatic compound being sulfonated and vapor of by-product water, are cooled and liquefied in condenser 45 and collected in the separator or receiver 46.

If excess aromatic compound for the sulfonation is used as the carrier, then receiver 46 is operated like receiver 21 in Fig. 1, decanting condensate of the aromatic compound to recycle line 47 and draining water condensate through line 48 with the use of automatic control device 49. But if a non-condensable inert gas is used as a vapor carrier, this gas may be led from receiver 46 into line 47, while separated condensate is drained from receiver 46. Condensate of excess volatile aromatic compound being sulfonated may be separated from the water collected in receiver 46 and may be used as part of the fresh aromatic feed, after being dried, if desired. Also, the carrier may be given a drying treatment in being recycled by pump 51, through heater 52 to the vapor carrier inlet line 42 of the reactor.

With sufficient residence of the liquid mixture in the reaction zone while flowing downwardly therein, completed reaction of the sulfonating agent may be obtained in the mixture when it reaches the bottom level. Liquid sulfonation product is continuously withdrawn at this bottom level through pipe 53, having a vapor seal bend 54, and recirculated by pump 55 through pipe 56 to the upper liquid level 39 in the reactor. As indicated at 57, the recirculated liquid product may be modified in temperature by heat exchange, as, for example, with the recycled carrier.

As in the operation of the unit represented in Fig. 1, a liquid mixture of the reactants and recirculated sulfonated product becomes heated to an optimum sulfonation temperature in the reaction zone of the unit shown in Fig. 2, heat being formed by the reaction. The countercurrent stream of vapor carrier introduced into the reaction zone at a less elevated temperature and at regulated rate maintains a constant reaction temperature.

In a system represented by Fig 2, a portion of the liquid sulfonation product is continuously removed through pipe 58. At this point the liquid product withdrawn need not contain any substantial amount of unreacted material.

The reaction is satisfactorily carried out at from 1 to 2 atmospheres absolute pressure, but lower or higher pressures may be used.

The process and apparatus described are adapted for sulfonation of various aromatic compounds, such as toluenes, xylenes, and other substituted benzenes, which similarly undergo sulfonating reactions with strong sulfuric acid, oleum, or other sulfonating agents under conditions which make it necessary to remove rapidly water or other volatile by-products liberated by the reaction, as soon as formed.

Several advantages obtained with the procedure described over batch sulfonation and other sulfonation procedures which do not utilize the principles of this invention are as follows:

1. Improved utilization of the sulfonating agent, avoiding secondary reactions which form disulfonic acids and sulfones.
2. Improved control of the reaction temperature and acid concentration throughout the reaction zone.
3. Improved mixing in the reaction zone without the need of mechanical agitators therein.

We claim:

1. A continuous sulfonation process which comprises continuously introducing into a vertically elongated reaction zone at approximately the same level thereof, separate streams of a liquid aromatic hydrocarbon, a sulfonating agent, and a recycled portion of the sulfonation product of the aromatic hydrocarbon and the sulfonating agent so as to maintain a liquid level of the three components in the reaction zone, passing the three streams in admixture with each other concurrently through the reaction zone to its opposite end, continuously passing through the reaction zone an extraneous stream of vapor of the aromatic hydrocarbon introduced to the bottom thereof, removing from the top of the reaction zone at a point above the liquid level therein a vaporous stream of the aromatic hydrocarbon and water, removing from said opposite end of the reaction zone a liquid stream of the aromatic hydrocarbon sulfonation product, and returning a portion of said product to the reaction zone as the aforesaid recycled portion.

2. A process according to claim 1, in which the three separate streams are introduced into an upper part of the vertically elongated reaction zone and flow concurrently downwardly therethrough countercurrent to the stream of extraneous aromatic hydrocarbon vapor introduced at the bottom.

3. A process according to claim 1, in which the three separate streams are introduced into the bottom of the elongated reaction zone and flow concurrently upward therethrough concurrently with the stream of extraneous hydrocarbon vapor introduced at the bottom.

4. A process according to claim 2, in which the aromatic hydrocarbon is benzene, in which the sulfonating agent is sulfuric acid, and in which the sulfonation product is benzenesulfonic acid.

5. A process according to claim 3, in which the aromatic hydrocarbon is benzene and in which the sulfonating agent is sulfuric acid, and in which the sulfonation product is benzenesulfonic acid.

A DONALD GREEN.
E. WENDELL CARRIER.

REFERENCES CITED

The following references are of record in the file of this patent:

UNITED STATES PATENTS

| Number | Name | Date |
|---|---|---|
| 1,210,725 | Tyrer | Jan. 2, 1917 |
| 1,212,612 | Dennis | Jan. 16, 1917 |
| 1,300,228 | Ambler et al. | Apr. 8, 1919 |
| 2,106,521 | Deansly | Jan. 25, 1938 |

FOREIGN PATENTS

| Number | Country | Date |
|---|---|---|
| 126,039 | Great Britain | May 8, 1919 |
| 1,956,571 | France | May 1, 1934 |